US006619670B2

(12) United States Patent
Alberici et al.

(10) Patent No.: US 6,619,670 B2
(45) Date of Patent: Sep. 16, 2003

(54) CHUCK UNIT FOR AUTOMATIC MACHINE TOOLS, DESIGNED TO PERFORM BOTH POWER TASKS AND FINISHING WORK

(76) Inventors: Giovanni Alberici, Via Castelvecchio, 33 Vigolzone (IT); Daniele Marangone, Via Bachelet, 5 Rivergaro (IT)

( * ) Notice: Subject to any disclaimer, the term of this patent is extended or adjusted under 35 U.S.C. 154(b) by 0 days.

(21) Appl. No.: 10/366,820

(22) Filed: Feb. 14, 2003

(65) Prior Publication Data

US 2003/0116926 A1 Jun. 26, 2003

Related U.S. Application Data

(63) Continuation of application No. 09/823,156, filed on Mar. 30, 2001, now abandoned.

(30) Foreign Application Priority Data

Apr. 5, 2000 (IT) .......................................... PC00A0011

(51) Int. Cl.[7] .............................................. B23B 31/26
(52) U.S. Cl. ...................................... 279/137; 409/233
(58) Field of Search ........................ 279/14, 134, 137; 409/233

(56) References Cited

U.S. PATENT DOCUMENTS 3,782,741 A * 1/1974 Laurenti .................... 279/137
4,207,785 A * 6/1980 Greis et al. ................. 279/137
4,789,280 A 12/1988 Dobat
4,828,049 A 5/1989 Preis
5,651,647 A * 7/1997 Ray ............................ 279/14
5,782,593 A 7/1998 Klement
2001/0028151 A1 * 10/2001 Alberici et al. ............. 279/137

FOREIGN PATENT DOCUMENTS

| DE | 842441 C | 6/1952 | |
|---|---|---|---|
| DE | 1961673 A | 6/1971 | |
| DE | 2320204 | * 1/1974 | ................. 279/137 |
| EP | 6806 | * 1/1980 | ................. 279/137 |
| JP | 3/57-205006 | * 12/1982 | ................. 279/137 |
| WO | WO 92/01532 A | 2/1992 | |
| WO | WO 97/02922 A | 1/1997 | |

* cited by examiner

Primary Examiner—Raleigh W. Chiu
(74) Attorney, Agent, or Firm—Notaro & Michalos P.C.

(57) ABSTRACT

A chuck unit for automatic machine tools perform both power tasks and high speed finishing of pieces with lubricant/coolant fluid flowing through a chuck shaft. The chuck unit includes a support on which a first chuck for a tool is mounted and driven by a motor. A second chuck is mounted inside the first chuck and is driven by the same or a second independent motor. A set of springs acts against a shaft with an attached gripper, to close the gripper in order to clamp the tool. The unit can therefore receive different types of tools and perform different tasks, eliminating the need to use different machines for different tasks. The pull of the power tool on upstream mechanical parts is discharged against the support structure of the first chuck.

10 Claims, 10 Drawing Sheets

CHUCK UNIT FOR AUTOMATIC MACHINE TOOLS, DESIGNED TO PERFORM BOTH POWER TASKS AND FINISHING WORK

CROSS-REFERENCE TO RELATED APPLICATIONS

This application is a continuation of U.S. patent application Ser. No. 09/823,156 filed Mar. 30, 2001 now abandoned, the entirety of which is hereby incorporated herein.

FIELD AND BACKGROUND OF THE INVENTION

This invention relates to a chuck unit for automatic machine tools, designed to perform both power tasks and high-speed finishing of pieces, with lubricant/coolant fluid flowing through the chuck shaft. For this purpose, the unit in accordance with the invention comprises two coaxial chucks fitted one inside the other, driven by separate motors or by the same motor.

In particular, the unit in accordance with the invention is designed in such a way that when tasks are performed with the power tool, the pull exerted by that tool on the upstream mechanical parts is only discharged onto the supporting structure of the power chuck, and no stresses are transmitted to the bearings of the second (speed) chuck.

The result is a unit which can receive different types of tool and perform different types of task, for which it has so far been most advantageous to use two separate machines.

Modern automatic machine tools designed to perform milling and contouring tasks, etc., comprise a structure to which an operating head with a number of degrees of freedom is fitted; this head comprises an end effector generally constituted by a chuck or an electric chuck, to which the tool required for each job is fitted.

The characteristics of these operating heads vary considerably, especially in chip-forming tasks, depending on whether the tasks performed are power tasks carried out with a roughing tool which rotates at a relatively low speed (approx. 2000–3000 rpm) to remove large amounts of material, and is therefore subjected to considerable stress, or finishing tasks in which the tool rotates at a much higher speed (15–20,000 rpm) to perform a finishing task, and therefore removes small amounts of material. The stresses to which the tool is subjected and the reactions it discharges onto the upstream devices require the use of chucks of different characteristics and dimensions, which necessitates the construction of different operating heads.

For this reason, when two different types of task need to be performed, separate machines are often used, partly because of the time taken to replace these heads and reset the machine. However, the need is felt for a machine which can perform both types of task, ie. power and speed tasks, with no need to replace the operating head or the end effectors.

This solution would bring considerable savings, enabling even small companies to equip themselves suitably with automatic machines of this kind.

SUMMARY OF THE INVENTION

This problem is now solved by the present invention, which relates to a chuck unit for automatic machine tools designed to perform both power and finishing tasks. The said unit comprises (i) two chucks mounted coaxially, one inside the other, (ii) means which allow a tool for roughing work and a tool for finishing work to be fitted to the said chucks, and (iii) means designed to discharge onto the structure of the assembly the pull exerted on the cone of the tool when the tool is fitted.

BRIEF DESCRIPTION OF THE DRAWINGS

This invention will now be described in detail, by way of example but not of limitation, by reference to the enclosed figures in which.

DESCRIPTION OF THE PREFERRED EMBODIMENTS

Figure 1:
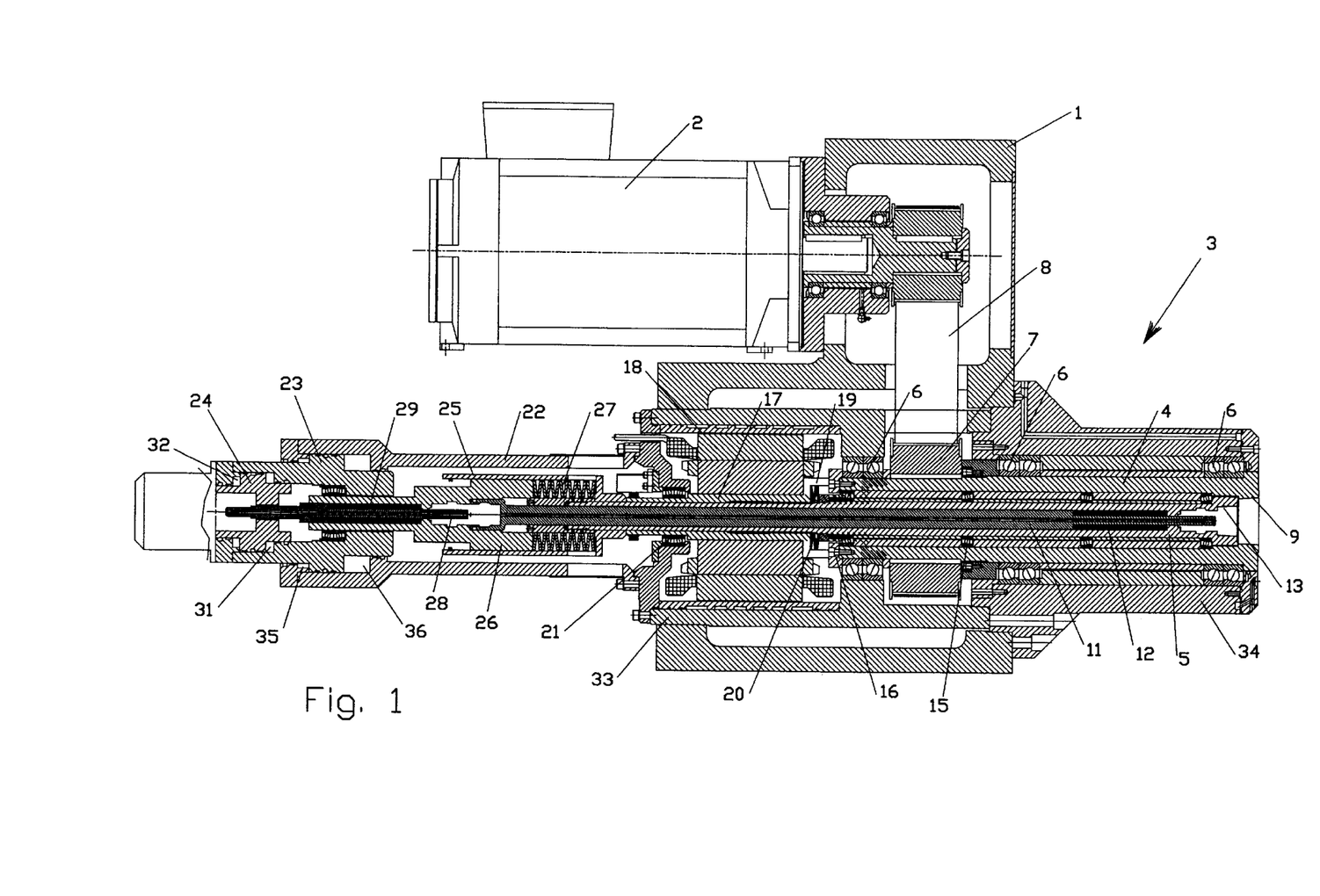
FIG. 1 shows a cross-section of a chuck unit in accordance with the invention, with two motors.

By reference to FIG. 1, the chuck unit in accordance with the invention comprises a support structure indicated as 1, to which are fitted an electric motor 2 and the actual chuck unit, indicated as 3 and housed in a sleeve 33 which is integral with structure 1.

The chuck assembly comprises a power chuck 4, inside which a speed chuck 5 is fitted coaxially with the said power chuck.

Power chuck 4 is fitted to structure 1 via sets of bearings 6, and a pulley or cogwheel 7, to which motion is transmitted by motor 2 via a belt 8, is fixed to the said power chuck.

Chuck 4 presents a conical opening 9 for a power tool, means for driving the tool being fitted in the said opening.

The tool is gripped by a gripper 10 shown in FIGS. 2 to 5; the said gripper is fitted to the end of a shaft 11 mounted inside speed chuck 5. The axes of shaft 11, chuck 5 and power chuck 4 coincide.

A set of springs 12 acts against one end of chuck 5 and against a shoulder of shaft 11, pressing shaft 11 inwards, to the position in which the said shaft tends to close the gripper in order to clamp the tool applied to the chuck.

Speed chuck 5, like power chuck 4, has a conical opening at the end shown as 13, in which means designed to drive the tool are fitted, and into which the cone of a finishing tool is inserted.

In accordance with the invention, the speed tools have a cone which is inserted into the seating of chuck 5, without coming into contact with the walls of conical opening 9 of the power tool, while the cone of the power tools is dimensioned so that it can be inserted into the corresponding seating of chuck 4 without coming into contact with chuck 5.

Chuck 5 is fitted inside chuck 4 via a set of bearings 15.

A plate or discoidal element 16 is fitted at the inner end of power chuck 4. A sliding grooved bushing 17 is fitted to chuck 5, and motor 18, which causes finishing chuck 5 to rotate, is mounted on the said bushing 17. Bushing 17 widens at the front to define a ring-shaped wall 19 designed to rest against plate 16.

A set of springs 20, located inside ring-shaped wall 19, act on one side against bushing 17 and on the other against plate 16, tending to distance bushing 17 from chuck 4.

Chuck 5 is fitted to structure 1, near the rear end, via bearings 21.

A cylinder 22 in which a piston 23 moves is fitted to the rear of sleeve 33. Piston 23 is hollow, and a second piston 24 moves inside it.

Two chambers 31 and 32 are defined on opposite sides of piston 24, and two more chambers 35 and 36 are defined on opposite sides of piston 23. A bushing 25 is fitted to the rear end of speed chuck 5. A body 26, which slides inside the said bushing 25, is pushed towards the exterior by a spring 27 which acts between the end wall of bushing 25 and body 26.

Body 26 is hollow; end 34 of shaft 11 penetrates into it on one side, and a second shaft 28, which is fitted with a gripper, illustrated in FIGS. 2 to 5 and indicated as 30, penetrates into it on the other.

Bushing 25 comes to rest against bushing 17, which is caused to rotate together with bushing 25 by chuck 5.

Bushing 25 in turn causes body 26 to rotate; the said body 26 can rotate freely in relation to pistons 23 and 24.

A spring 29 acts on shaft 28, tending to distance it from shaft 11.

The operation of the unit in accordance with the invention will now be explained, by reference to FIGS. 2 to 5.

Figure 2:
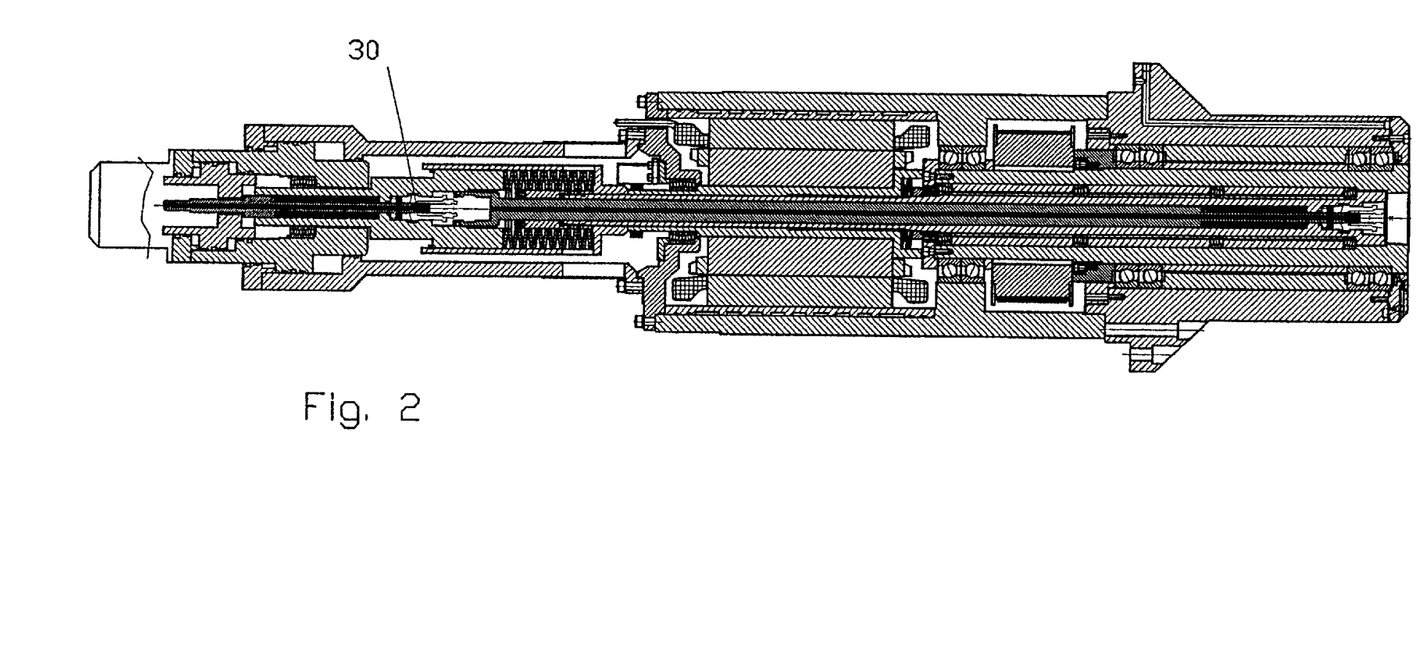
FIG. 2 shows a cross-section of the chuck in the rest position.

FIG. 2 shows the assembly in the rest position.

Spring 12 pushes shaft 11 back, with gripper 10 inside chuck 5.

Springs 20 push bushing 17 back to that a gap of (for example) 1 or 2 millimeters remains between ring-shaped wall 19 and plate 16.

Figure 3:
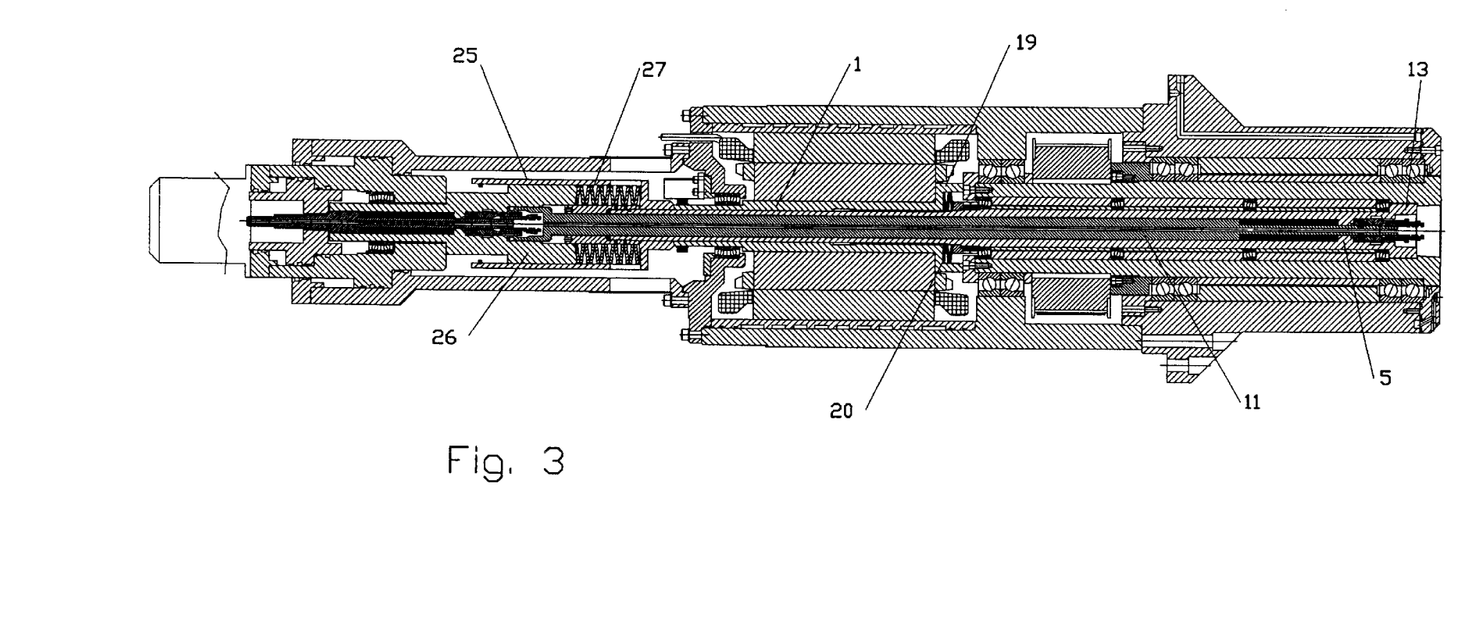
FIG. 3 shows a cross-section of the chuck unit in the tool-receiving position.

To fit a roughing tool, the assembly is positioned as shown in FIG. 3.

For this purpose, starting from the position shown in FIG. 2, a pressurized fluid is introduced into chamber 32 so that piston 24 advances and acts on gripper 30 via shaft 28 to bring the gripper into the opening position.

At the same time, a pressurized fluid is introduced into chamber 35 so as to advance piston 23, which pushes forward body 26 and shaft 11, to open gripper 10.

The advance of body 26 compresses springs 27, which in turn push forward bushing 25 and bushing 17, overcoming the force of spring 20, and bring ring-shaped wall 19 into contact with the corresponding seatings in plate 16, thus closing the play between the two parts.

Figure 4:
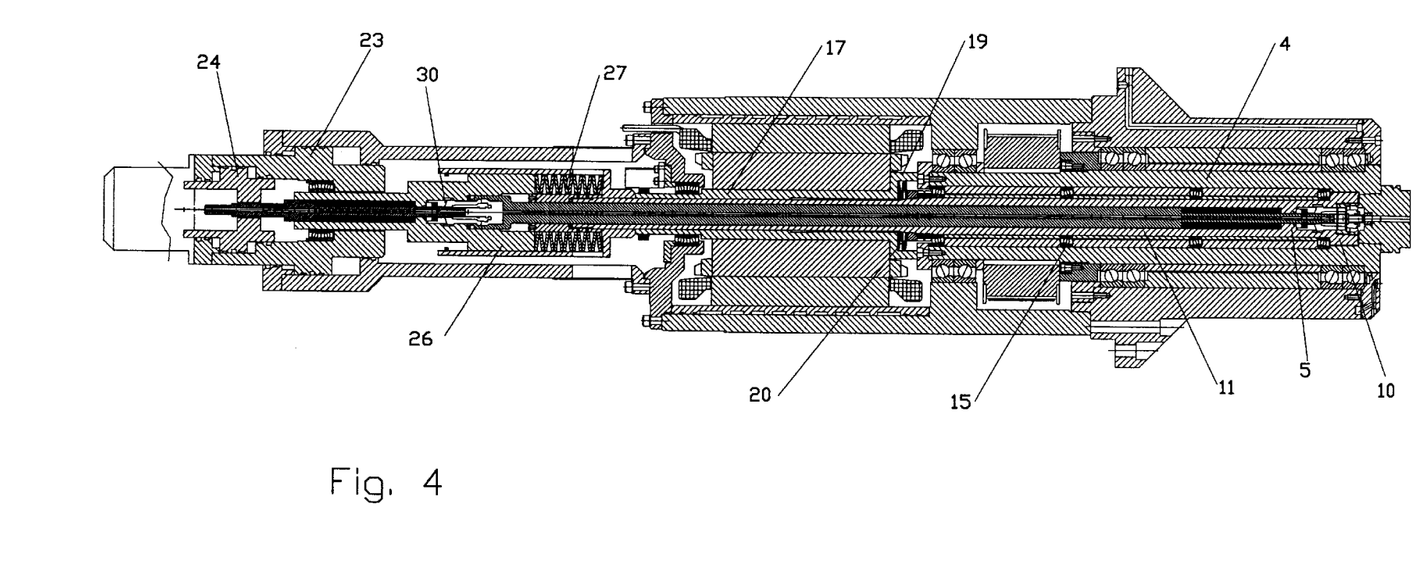
FIG. 4 shows a cross-section of the chuck unit in accordance with the invention, with the power tool fitted.

The power tool is then inserted into conical seating 9 in chuck 4 and locked with gripper 10.

For this purpose, piston 24 is released; the said piston 24 moves backwards and closes gripper 30, which locks shaft 11 in the position which closes gripper 10.

Piston 23 is then released, and is pushed backwards to release body 26. Body 26 is pushed by springs 27.

The force exerted by springs 27 acts on shaft 11 on one side, via body 26 and gripper 30, to lock the tool, while on the other side, via bushing 27 and bushing 17, it keeps ring-shaped wall 19 pressed against plate 16. It is then possible to start up motor 2, which transmits motion via belt 8 to pulley 7, and from there to chuck 4.

Chuck 4 performs the power task, and the thrust which counterbalances the traction force exerted on the tool by shaft 11 to maintain it in position is discharged onto bushing 17 and from there to plate 16 and chuck 4, without subjecting bearings 15 and 21 of the finishing chuck to any particular stress.

Figure 5:
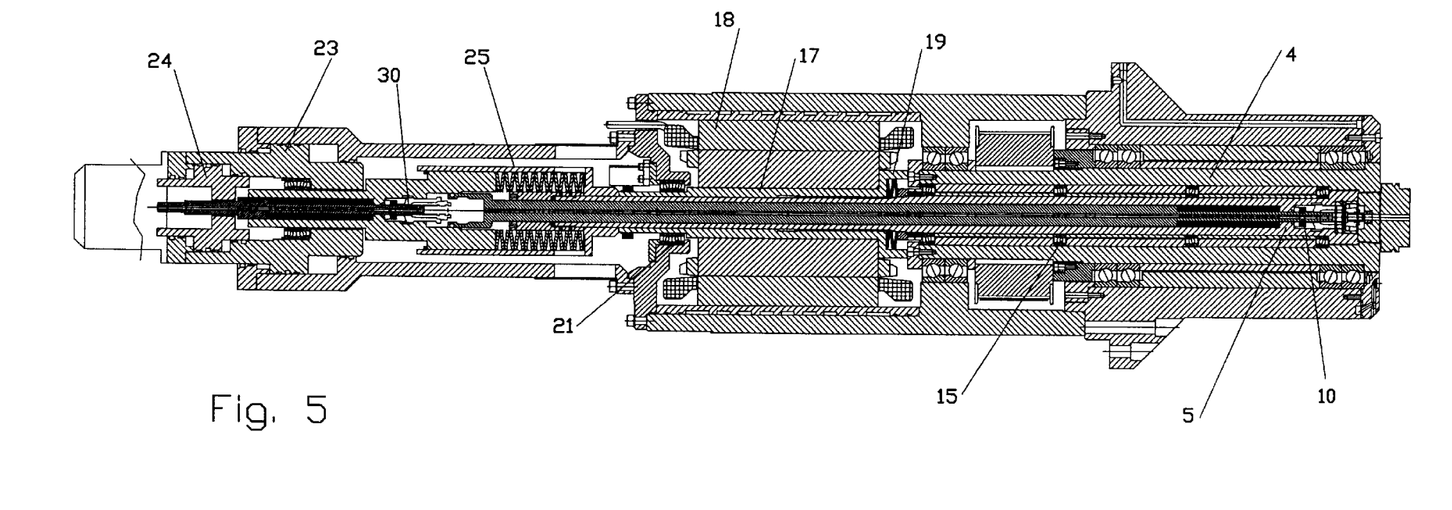
FIG. 5 shows a cross-section of the chuck unit in accordance with the invention, with the finishing tool fitted.

When the finishing tool needs to be fitted to chuck 5, the unit is returned to the position shown in FIG. 3, and the cone of the new tool is inserted into seating 13 of chuck 5.

Piston 23 is then released, moves backwards and releases piston 24, thus releasing gripper 30 which disengages from shaft 11.

The two pistons 23 and 24 move backwards and springs 27 are released. The force of springs 20 then prevails over bushings 17 and 25; the said springs 20 push back bushing 17 and ring-shaped wall 19, thus restoring the play with plate 16.

At this point motor 18 of the electric chuck can be switched on. The said motor 18 causes bushing 17 to rotate and finishing chuck 5 rotates with it. Finishing chuck 5 can rotate freely on bearings 15 and 21.

Figure 6:
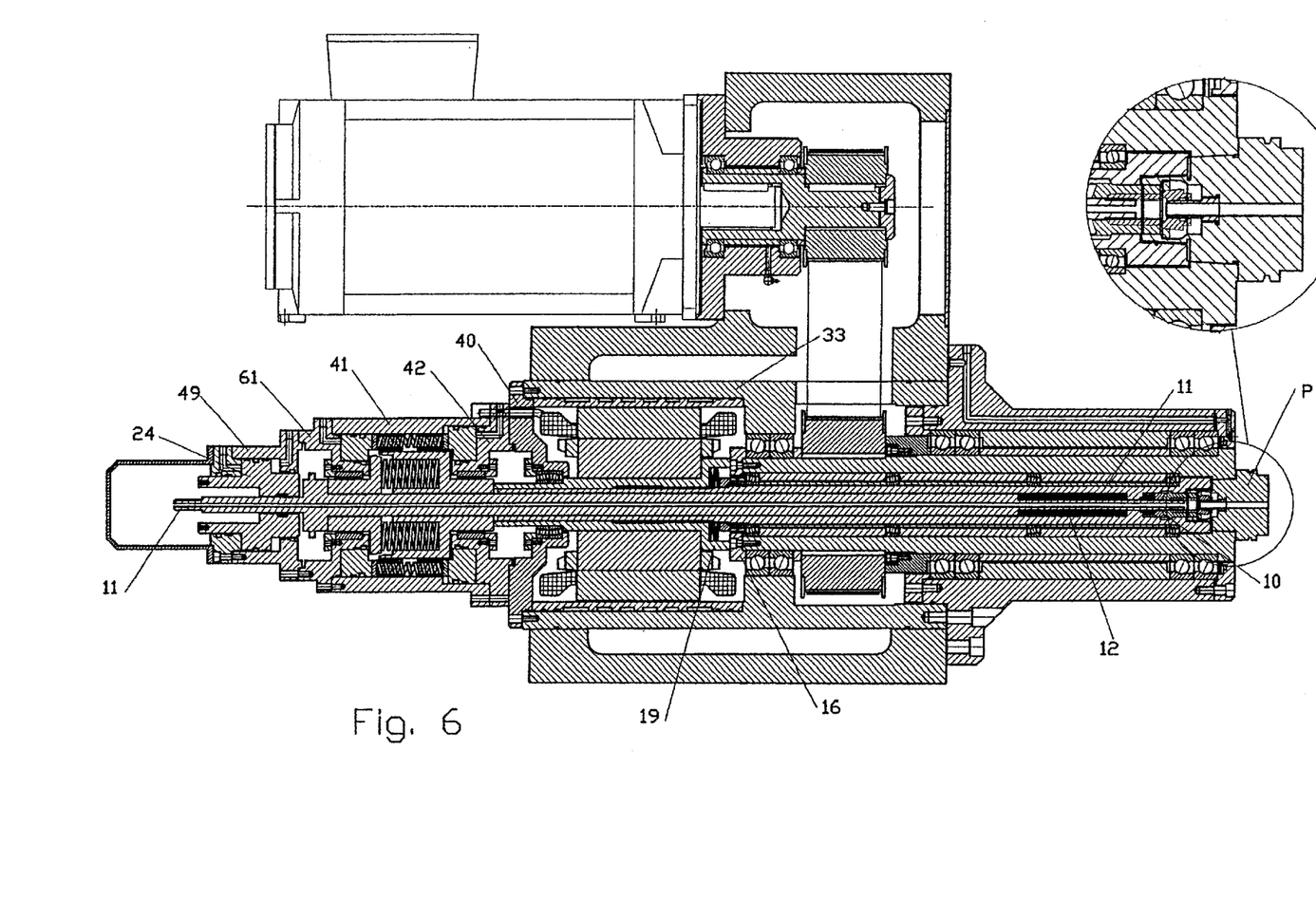
FIGS. 6 & 7 show the chuck unit in accordance with a further preferred embodiment of the invention, with the power and finishing tools fitted.
Figure 7:
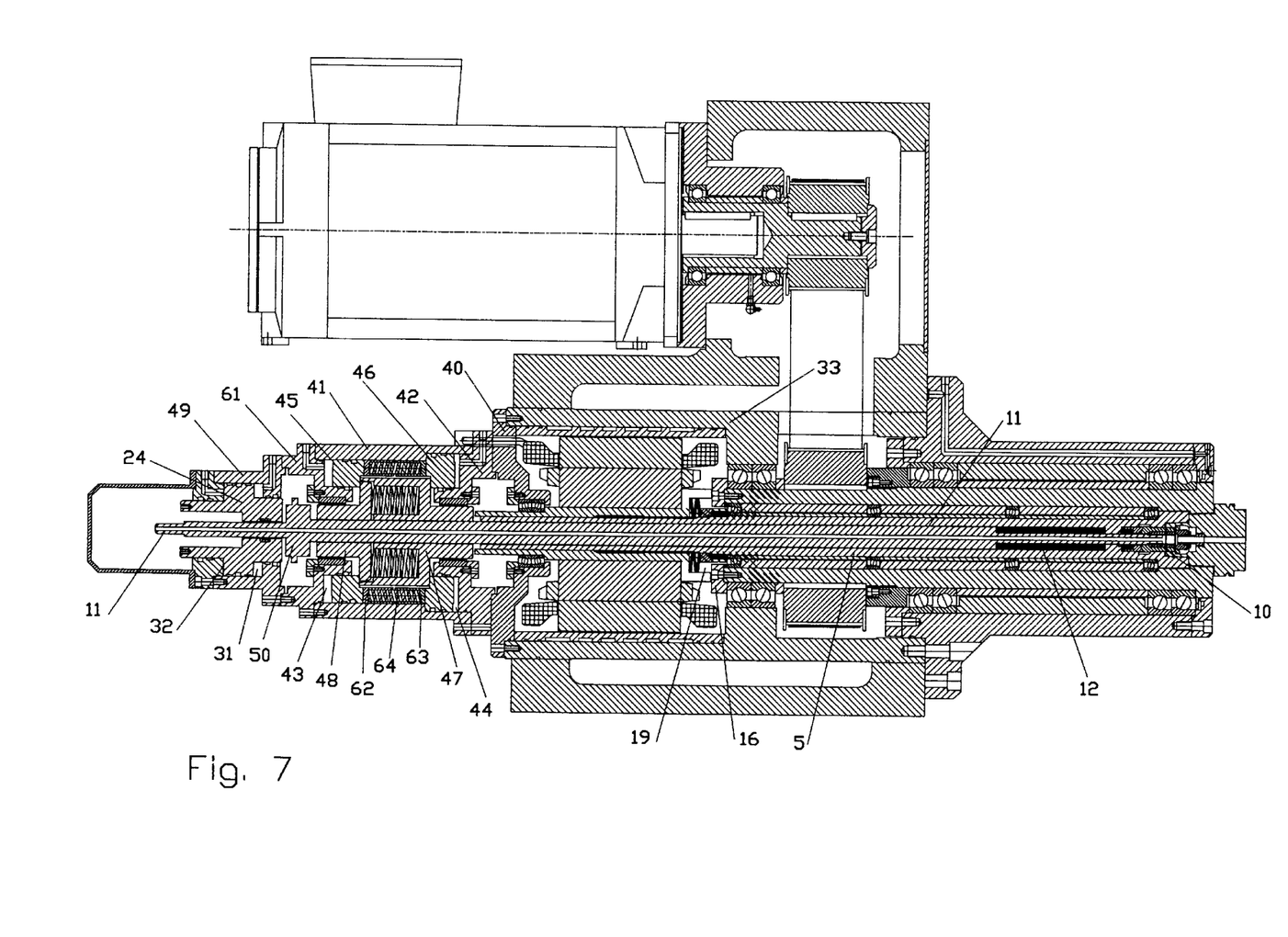

FIGS. 6 and 7 show a further preferred embodiment of the chuck unit according to the invention, which has more compact dimensions than the one described above and eliminates the need to fit flanges for conveyance of coolant, because the coolant can flow directly through shaft 11.

In this configuration, two coaxial cylindrical bodies 41 and 42 are fitted to rear plate 40 of sleeve 33, cylinder 41 having a lightly smaller inner diameter than cylinder 42.

Internally, cylinders 41 and 42 are shaped to define a pair of ring-shaped chambers 43 and 44 in which two ring-shaped pistons shown as 45 and 46 slide.

Inside cylindrical bodies 41 and 42 there is a bushing 47, fitted to slide on shaft 11.

The diameter of bushing 47 is larger than the inner diameter of pistons 45 and 46, and the said bushing 47 acts as a stop for them.

A flange 48 is also fitted to slide on shaft 11; the outer diameter of the said flange 48 is substantially equal to the inner diameter of bushing 47.

A set of springs 60, which tend to distance bushing 47 from flange 48, are housed in bushing 47.

A cylindrical body 61 which supports cylindrical body 49 is fitted to cylindrical body 41. Piston 24 slides in cylindrical body 49, defining two opposite ring-shaped chambers 31 and 32 inside it.

Shaft 11 projects from bushing 48 and is elongated at the rear so that it penetrates into a seating in piston 24.

The unit operates as follows.

To fit the power tool, start with the configuration shown in FIG. 6, with pressurized fluid in chambers 43 and 44. This pressure pushes pistons 45 and 46 towards one another; piston 46 strikes wall 65 of cylindrical body 41, of smaller diameter, while piston 45 strikes the edge of bushing 47, freeing a space which allows shaft 11 to slide.

Pressurized fluid is then conveyed into chamber 32, thus causing the movement of piston 24, which pushes forward shaft 11 (to the right in the figure), opening gripper 10 which is inserted into the cone of the power tool shown as P.

At this point, the pressure is released from chambers 32, 43 and 44, causing pressurization of chamber 31.

Springs 60 then push flange 48 towards the rear of the chuck unit, and shaft 11 moves with it. This movement of shaft 11 causes the gripper to lock power tool P in its seating.

Flanges 62 and 63, via springs 64, ensure that pistons 45 and 46 return to their end-of-stroke positions against flanges 61 and 42.

The force exerted by springs 60 overcomes that of springs 20, with the result that on one side springs 60 push bushing 47 to press against bushing 17, thus pushing ring-shaped wall 19 against plate 16, while on the opposite side flange 48 engages the enlarged end of shaft 11, shown as no. 50, exerting sufficient force on the shaft to counteract the thrust discharged by the tool.

To fit the finishing tool, start with the configuration shown in FIG. 6, with the pressurized fluid in chambers 43 and 44. Bring gripper 10 forward again and insert the cone of the finishing tool, which penetrates into seating 13, after which the pressurized fluid is only discharged into chamber 32, thus pressurizing chamber 31.

Springs 60 remain compressed as a result of the force exerted by pistons 45 and 46.

In this position, the edge of flange 47 remains a few millimeters away from flange 17, which can therefore be pushed backwards by springs 20, thus interrupting contact between ring-shaped wall 19 and plate 16.

In this position, shaft 11 is pushed backwards, but this time by springs 12, which exert the necessary force to clamp the cone of the finishing tool.

Figure 10:
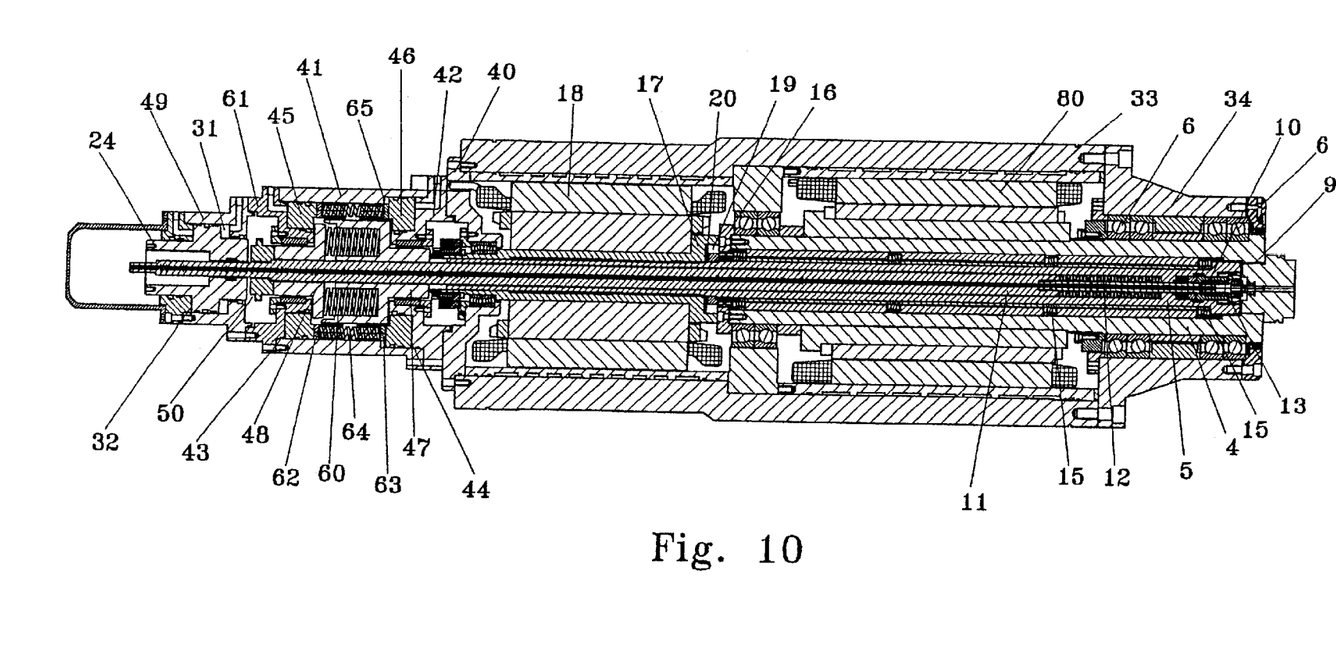
FIG. 10 shows a cross-section of a further preferred embodiment of the chuck unit in accordance with the invention.

FIG. 10 shows a further embodiment of the chuck unit in accordance with the invention, which is more compact and practical.

In this embodiment the power chuck 4 is actuated by a motor 80, housed inside the sleeve 33.

The support structure is no more necessary, and this enhances the interchangeability of the apparatus.

Figure 8:
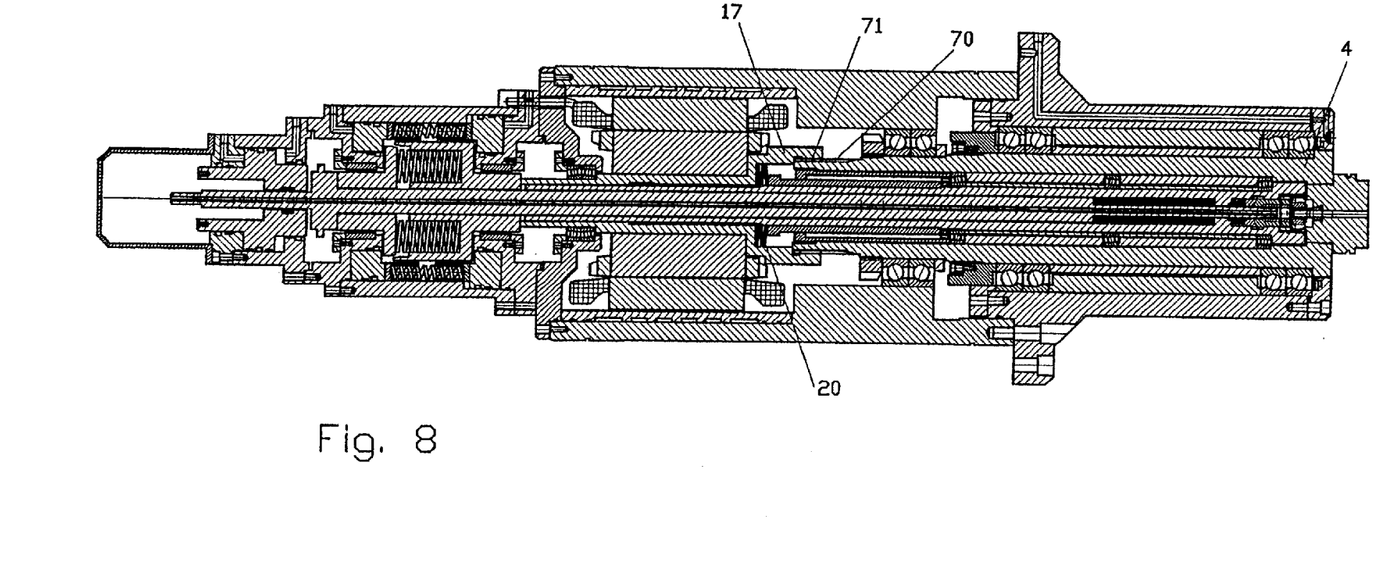
FIGS. 8 & 9 show a cross-section of the chuck unit in accordance with the invention, with a single motor.
Figure 9:
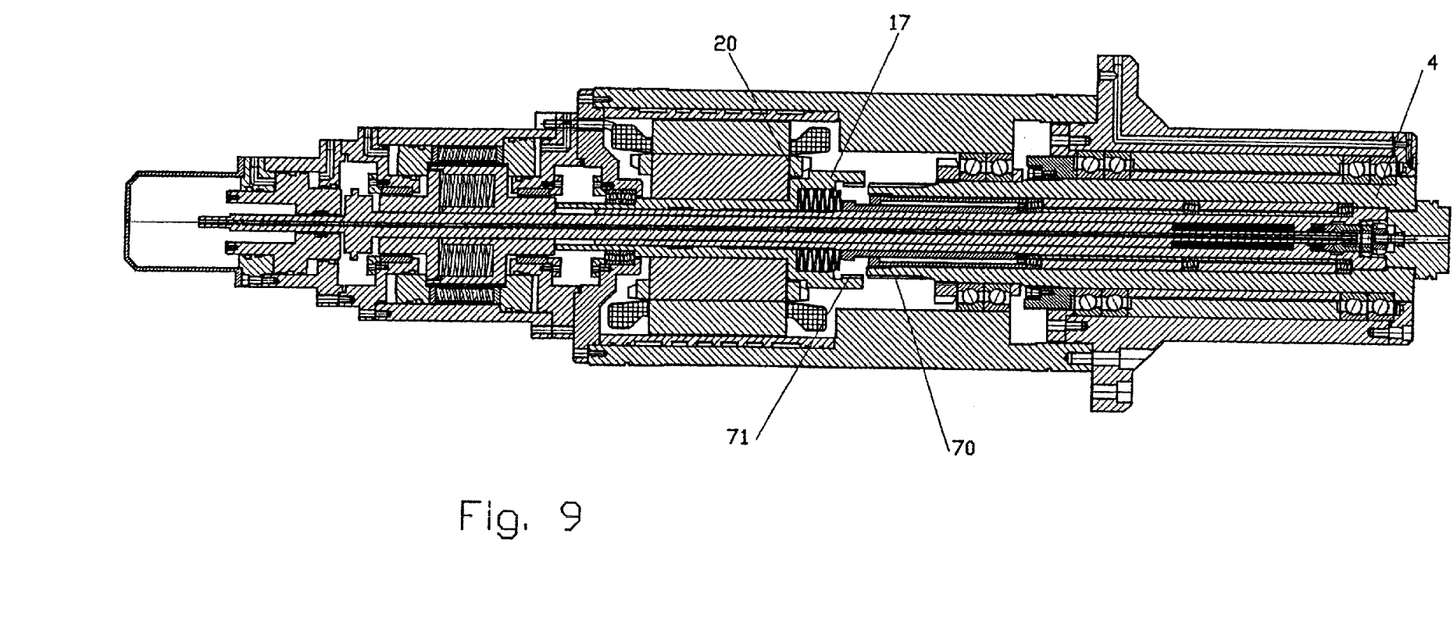

FIGS. 8 and 9 show a further embodiment of the chuck unit in accordance with the invention, which is much cheaper than the one described above because electric motor 2, pulley or cogwheel 7 and belt 8 are not used; if motor 18 is sufficiently powerful, it can be used for power tasks as well as finishing tasks.

In this configuration, power chuck 4 has a male coupling 70 on the back. Flange 17 has a female coupling 71 on ring-shaped wall 19.

The unit operates as follows:

To fit the power tool, always start with the configuration shown in FIG. 6, with the pressurized fluid in chambers 43 and 44.

Pressurized fluid is then conveyed into chamber 32, thus causing the movement of piston 24, which pushes forward shaft 11 (to the right in the figure), opening gripper 10 which is inserted into the cone of the power tool shown as P.

At this point, the pressure is released from chambers 32, 43 and 44, causing pressurization of chamber 31.

Springs 60 then push flange 48 towards the rear of the chuck unit, and shaft 11 moves with it. This movement of shaft 11 causes the gripper to lock power tool P in its seating.

Flanges 62 and 63, via springs 64, ensure that pistons 45 and 46 return to their end-of-stroke positions against flanges 61 and 42.

The force exerted by springs 60 overcomes that of springs 20, with the result that on one side springs 60 push bushing 47 to press against bushing. 17, thus causing ring-shaped wall 19 to engage with female connector 71 above male connector 70 of chuck 4.

On the opposite side flange 48 engages the enlarged end of shaft 11, shown as no. 50, exerting sufficient force on the shaft to counteract the thrust discharged by the tool.

To fit the finishing tool, start with the configuration shown in FIG. 6, with the pressurized fluid in chambers 43 and 44. Bring gripper 10 forward again and insert the cone of the finishing tool, which penetrates into seating 13, after which the pressurized fluid is only discharged into chamber 32, thus pressurizing chamber 31.

Springs 60 remain compressed as a result of the force exerted by pistons 45 and 46.

In this position, the edge of flange 47 remains a few millimeters away from flange 17, which can therefore be pushed backwards by springs 20, thus interrupting contact between ring-shaped wall 19 and female connector 71, and between chuck 4 and male connector 70.

In this position, shaft 11 is pushed backwards, but this time by springs 12, which exert the force necessary to clamp the cone of the finishing tool. As will be clear from the description given, the chuck unit in accordance with the invention is very useful because it enables two different types of job to be performed with a single machine, and allows the operator to change from one to the other in a few seconds merely by replacing the tool, with no need to use a second machine or to replace the end effectors, which would involve resetting the zeros, repositioning the workpieces and so on, leading to considerable wastage of time and long machine stoppages.

An expert in the field could devise numerous modifications and variations, all of which should be deemed to fall within the scope of this invention.

What is claimed is:

1. A chuck unit for automatic machine tools comprising:
   first and second independent chucks mounted coaxially, one inside the other, and adapted to receive different tools, the chucks each having seating for the tools, which are coaxial and located on a same side of the chuck unit;
   a supporting structure;
   a cone gripper;
   a shaft on which the cone gripper is fitted mounted coaxially with the chucks; and
   a pair of flanges pushed by an elastic member for pulling the shaft into a closed position, and for discharging the pulling to the support structure.

2. A chuck unit according to claim 1, further comprising a first motor for driving the first chuck and a second independent motor for driving the second chuck, wherein said second chuck is mounted inside and is coaxial with said first chuck.

3. A chuck unit according to claim 2, wherein said second chuck is a finishing chuck and is mounted inside said first chuck which is a power chuck.

4. A chuck unit according to claim 1, wherein said first and second chucks are driven by a single motor.

5. A chuck unit according to claim 1, further comprising:
   a bushing slidably fitted on an inner one of the first and second chucks and connected to a drive motor with means for engaging an outer one of the first and second chucks and rotating said outer chuck;
   thrust means for keeping said bushing apart from said outer chuck; and
   means for counteracting the force exerted by said thrust means by pushing said bushing into engagement with said outer chuck.

6. A chuck unit according to claim 1, wherein the cone gripper comprises a cone section and a connector, a portion of said cone section between said connector and a body of a tool is so dimensioned as to engage a corresponding seating without interfering with a seating of the second chuck.

7. A chuck unit according to claim 1, wherein the elastic member lies between the pair of flanges, pushing the first one of said flanges against a first ring-shaped piston and pushing another of said flanges against a second ring-shaped piston.

8. A chuck unit comprising:

first and second independent chucks mounted coaxially, one inside the other, and adapted to receive different tools, the chucks each having seating for the tools, which are coaxial and located on a same side of the chuck unit;

first and second independent motors, for driving each of the respective first and second chucks;

a support;

a sleeve fixed to said support, wherein said first chuck is a power chuck and is fitted into said sleeve, and said second is a finishing chuck and is fitted inside said sleeve coaxially with and inside the power chuck;

a shaft housed inside said finishing chuck fitted at one end with a tool cone gripper, wherein said shaft is pushed by springs, locking said gripper;

a first bushing fitted to slide on said finishing chuck and driven by a independent motor of said finishing chuck;

first elastic means for pushing the said first bushing in a direction in which said power chuck retracts;

a second bushing fitted to slide on said finishing chuck;

a first piston fitted inside said second bushing, wherein the end wall of said second bushing and one side of said first piston are engaged by second elastic means for pushing said first piston into a stop means fitted in a rear part of the chuck unit for stopping said elastic means and for pushing said second bushing into said first bushing, causing said first bushing to engage said power chuck, or a wall integral with said power chuck; and a means for engaging said shaft in order to control its displacement in relation to said first bushing, and cause said gripper fitted to said shaft to open and lock a cone of said tools inserted in the power chuck or finishing chuck.

9. A chuck unit according to claim 8, further comprising:

a second piston, which is coaxial with said first piston and engages and pushes said first piston to compress said second elastic means; and a second shaft that is fitted with a further gripper and engages a rear end of said first mentioned shaft, wherein said first mentioned shaft is located inside said second piston.

10. A chuck unit comprising:

first and second independent chucks mounted coaxially, one inside the other, and adapted to receive different tools, the chucks each having seating for the tools, which are coaxial and located on a same side of the chuck unit;

first and second independent motors, for driving each of the respective first and second chucks;

a first bushing slidably fitted on said second chuck which is a finishing chuck, wherein said first bushing is adapted to move between a resting position, where its front edge rests against a plate integral with said first chuck which is a power chuck, and a retracted position, where the first bushing retracts from said plate;

a second bushing slidably fitted on a shaft behind said first bushing;

a flange slidably fitted on said shaft, which is adapted to move between a position in which it approaches said second bushing and a position in which it moves away from said second bushing;

a set of springs, located inside said second bushing, which displace said flange from said second bushing;

a pair of ring-shaped pistons situated in chambers at opposite ends of a fixed stop;

a piston fitted behind said second bushing for engaging said shaft on which said tool gripper is fitted; and pump means for pumping a pressurized fluid into said chambers in which the ring-shaped pistons are situated, pushing said pair of pistons toward one another, and causing one of said pistons to engage said fixed stop and the other piston to engage said second bushing, thus positioning flange.

\* \* \* \* \*